No. 12,684. REISSUED AUG. 27, 1907.

W. A. RICHARDSON.

SIGNAL.

APPLICATION FILED APR. 16, 1907.

Witnesses:
Thos. S. Sprigg.
E. V. Mackenzie

Inventor:
William A. Richardson
by C. M. Clarke
his attorney

THE NORRIS PETERS CO., WASHINGTON, D. C.

UNITED STATES PATENT OFFICE.

WILLIAM A. RICHARDSON, OF EDWARDSVILLE, ILLINOIS, ASSIGNOR TO CHAMELEON SIGNAL & MANUFACTURING COMPANY, OF PIERRE, SOUTH DAKOTA, AND CHICAGO, ILLINOIS, A CORPORATION OF SOUTH DAKOTA.

SIGNAL.

No. 12,684. Specification of Reissued Letters Patent. Reissued Aug. 27, 1907.

Original No. 761,787, dated June 7, 1904, Serial No. 186,984. Application for reissue filed April 16, 1907. Serial No. 368,611.

*To all whom it may concern:*

Be it known that I, WILLIAM ALLEN RICHARDSON, a citizen of the United States, residing at Edwardsville, Madison county, Illinois, have invented a certain new and useful Improvement in Signals, of which the following is a full, clear, and exact description, such as will enable others skilled in the art to which it appertains to make and use the same, reference being had to the accompanying drawings, forming part of this specification, in which—

Figure 1:
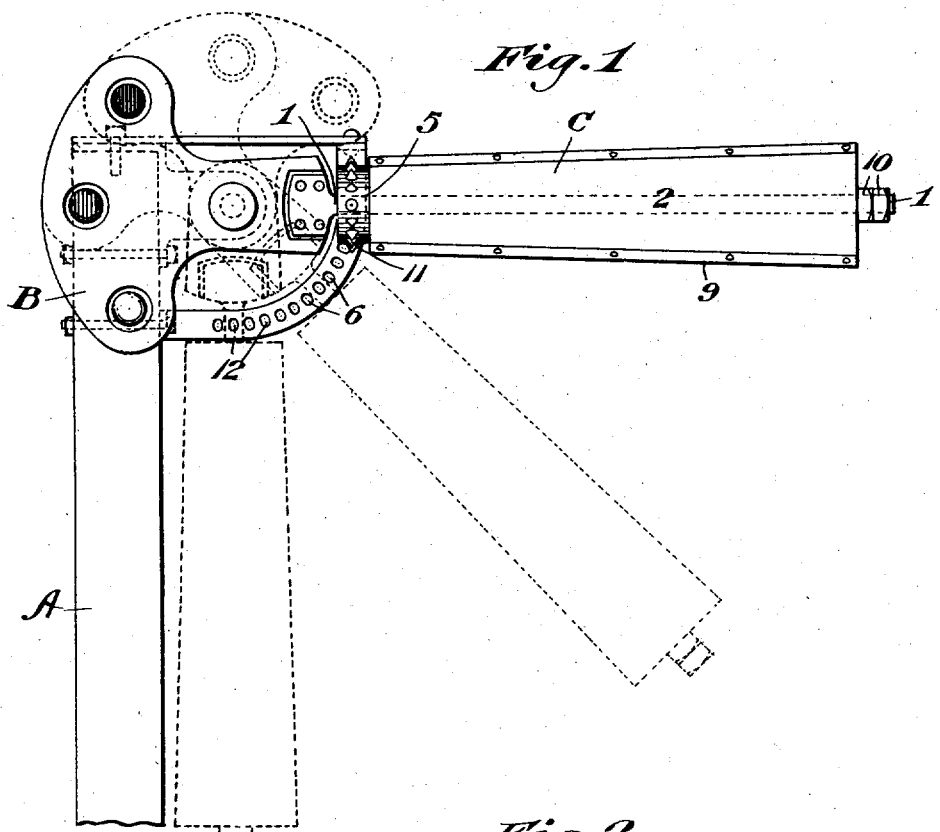
Figure 2:
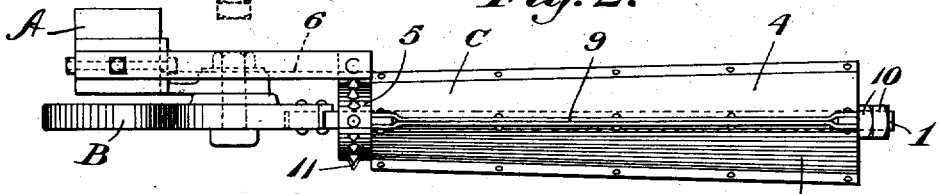
Figure 3:
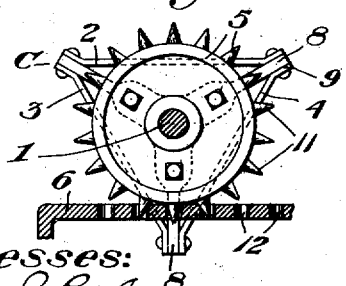
Figure 4:
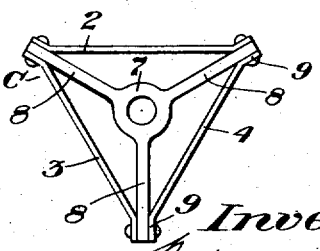

Figure 1 is an elevation, the signal being shown by full lines in danger position, by light dotted lines in caution position, and by heavy dotted lines in safety position. Fig. 2 is a top plan view, the semaphore-arm having its position slightly altered from that illustrated in Fig. 1 in order to more clearly illustrate the meeting edges of two sides of the semaphore-arm. Fig. 3 is a view looking from what may be termed the "inner" end of the semaphore-arm and the gear attached thereto, the supporting-rod being shown in section and the rack being also shown in section and partly broken away; and Fig. 4 is an elevation of the outer end of the semaphore-arm.

This invention relates to improvements in signals, and more particularly to signals especially designed for use along railroad-tracks.

For many years it has been common to pivot a semaphore-arm or paddle upon a post or other suitable support, this paddle being supported in horizontal position to indicate danger, in vertical position to indicate safety, and in an oblique position intermediate the positions of safety and danger to indicate caution. The semaphore-arm has heretofore generally been a mere paddle, usually painted red, and in its various positions the same side of the paddle has always been displayed to the engineer, so that the engineer has had only the position of the paddle to guide him, this paddle of course always exhibiting the same color. As a matter of fact, therefore, the paddles or semaphore-arms being usually painted the danger color—viz: red—the engineers have heretofore run by this danger color when the arm bearing such color has been in other than horizontal or danger position.

The primary object of the present invention is to provide a signal of the character indicated so constructed that the semaphore-arm or paddle exhibits to the engineer a color whose meaning corresponds to the meaning of the position which the arm or signal-paddle occupies, the present signal thus signaling the engineer by color as well as by position, and making it unnecessary for the engineer to run past the danger color. To this end and also to improve generally upon devices of the character indicated the invention consists in the various matters hereinafter described and claimed.

Referring now more particularly to the drawings, A indicates the support, here shown as the usual post.

B is what may be termed the "carrier" for the semaphore-arm, this carrier being pivotally supported upon the post, and C is the semaphore-arm or signal proper. A signal comprising a carrier, with its semaphore-arm, the carrier being pivotally supported upon the post, is very old and well understood, so that neither the construction of the post or the carrier, the manner of pivotally supporting this carrier upon the post, nor the means for operating such carrier and holding the same in its various signaling positions need be herein described. Extending from the said carrier is a rod or shaft 1, and rotatably mounted upon this rod is the signal proper or semaphore-arm C, the said rod 1 extending through and forming the longitudinal axis of said arm. This arm C is provided with a plurality of signal faces or sections, the arm being here shown as triangular in cross section, and thus having three such faces 2, 3 and 4, respectively. Manifestly as this triangular arm is rotated about its shaft 1 the different faces are brought into signaling position. These faces are painted appropriate colors. The triangular semaphore-arm is adapted to be used when the arm is designed to occupy three positions. In such event one of the faces,—say the face 2—will be painted the danger color, usually red, the face 3 will be painted the caution color—say yellow—and the face 4 will be painted the safety color, say green. Also rotatably mounted upon the rod or shaft 1 and secured to the signal-arm to rotate therewith is a gear 5, which cooperates with a segmental rack 6, supported upon the post or support A. The signal-arm C and its gear 5 are so placed upon the rod or shaft that when the signal-arm is in horizontal or danger position the red face 2 is exhibited in signaling position. As the carrier B moves about its pivot the gear 5 engages the rack 6 and is rotated by said rack in a well-understood manner, the gear and rack being so proportioned that when the semaphore-arm lies in its intermediate or caution position the gear and its connected semaphore-arm will have been so moved about the shaft that the yellow face 3 is brought into exhibiting or signaling position and when the arm lies in vertical or safety position the green face 4 will be presented in signaling position. Thus the present signaling-arm always presents a color whose meaning corresponds to the meaning conveyed by the position which the arm occupies, and it is never necessary for the engineer to run past a signal exhibiting the danger color.

In the preferred embodiment of the present invention the signal-arm is triangular in cross-section, so that the three signals—viz., danger, caution, and safety—can be displayed. A convenient form of triangular signal-arms is illustrated in the drawings. At each end of the arm is a spider having a central portion 7, through which the shaft or rod 1 extends, and spider-arms 8 radiate from this central portion or hub. Sheets of suitable material, such as galvanized iron, are riveted or otherwise suitably secured to these arms, and at their meeting edges these sheets of material are preferably fastened together by rivets or other suitable securing means, as shown at 9. The gear 5 is bolted or otherwise secured upon the inner spider, and suitable nuts 10 upon the outer end of the rod 1 bear against the outer face of the hub of the outer spider, and thus hold the rotatable signal-arm is position. Preferably the gear 5 is a spur-wheel, as illustrated, the spurs 11 taking into holes 12, which extend through the segmental rack 6. Thus these spurs serve to punch dirt, snow, ice, &c., out of the holes 12, and thus the proper operation of the arm C is insured.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is;—

1. In a signal, a movable carrier, a signal-arm pivotally mounted thereon, a spur-gear connected to said arm, and a rack with which said gear coöperates and provided with perforations adapted to receive the spurs of said gear; substantially as described.

2. In a signal, the combination with a shaft, of a signal-arm comprising end spiders having hubs receiving said shaft and arms extending from said hubs, and face-plates extending between said spiders and connected to the arms thereof, the edges of adjacent face-plates being connected together; substantially as described.

3. In a signal, the combination with a pivoted carrier, of a triangular signal extending beyond the carrier, and means arranged to rotate the signal when the carrier is tilted.

4. In a signal, the combination with a pivoted carrier and a supporting shaft extending beyond the carrier, of a triangular signal rotatably mounted on said shaft, and means arranged to rotate the signal when the carrier and its shaft are tilted.

5. In a signal, the combination of a support provided with an annular rack, a carrier pivotally mounted on the support provided with means for carrying the signal, and a triangular signal rotatably mounted on said means and provided with a toothed gear engaging said rack.

In testimony whereof I hereunto affix my signature, in the presence of two witnesses, this 10th of April, 1907.

W. A. RICHARDSON.

Witnesses:
GEO. D. BURROUGHS,
N. L. RYDER.